United States Patent [19]

Cozewith et al.

[11] 4,306,041

[45] Dec. 15, 1981

[54] PROCESS FOR THE PREPARATION OF ETHYLENE-HIGHER ALPHA OLEFIN POLYMERS (P-891)

[75] Inventors: Charles Cozewith, Westfield, N.J.; George N. Schmit, Baton Rouge, La.

[73] Assignee: Exxon Research & Engineering Co., Florham Park, N.J.

[21] Appl. No.: 130,478

[22] Filed: Mar. 14, 1980

[51] Int. Cl.$^3$ .......................................... C08F 210/18
[52] U.S. Cl. ..................... 526/65; 526/119; 526/66; 526/282
[58] Field of Search .......................... 526/65, 66, 282

[56] References Cited

U.S. PATENT DOCUMENTS

| | | | |
|---|---|---|---|
| 3,718,632 | 2/1973 | Gardner et al. | 526/65 |
| 4,078,131 | 3/1978 | Zarauz | 526/65 |

*Primary Examiner*—Edward J. Smith
*Attorney, Agent, or Firm*—H. L. Cohen

[57] ABSTRACT

A method for obtaining improved diene conversion in the manufacture of EPDM type terpolymers is disclosed in which the polymerization reaction is conducted in a series of two or more stirred reactors with substantially all of the non-conjugated diene monomer being fed to the first reactor to thereby produce a polymer that has a non-uniform diene content.

19 Claims, No Drawings

PROCESS FOR THE PREPARATION OF ETHYLENE-HIGHER ALPHA OLEFIN POLYMERS (P-891)

BACKGROUND OF THE INVENTION

This invention relates to a process for preparing ethylene-higher alpha olefin compositions such as ethylene-($C_3$-$C_8$) alpha olefins and a non-conjugated diene, for example, EPDM type polymeric compositions. More particularly, the invention relates to a new process for obtaining improved diene conversion in the manufacture of this class of polymers.

EPDM is the ASTM designation for a terpolymer of ethylene, propylene (a higher alpha-olefin) and a non-conjugated diene. In such terpolymers, the ethylene and propylene form a fully saturated backbone of methylene linkages, and unsaturated groups in the chain result from the incorporation of the non-conjugated diene, usually dicyclopentadiene, ethylidene norbornene or 1,4 hexadiene, which is included to provide readily available cross-linking sites for sulfur curing.

The diene monomer used in the production of the EPDM rubber costs significantly more than the ethylene and propylene and adds substantially to the expense of making this type of polymer. Moreover, if some of the diene remains unreacted in the polymer, it will react with the sulfur upon curing. Accordingly, in order to have an economically efficient process, it is normally necessary to recover unreacted diene from the polymerization mixture for recycle back to the polymeriziation reactor. These recovery procedures, however, are in themselves costly and often lead to diene losses. Thus, it is highly desirable to obtain a high enough conversion of diene monomer to polymer to eliminate the need for diene recycling and reduce manufacturing costs.

EPDM polymers are commonly produced in stirred flow reactors of either one or more stages. For example, U.S. Pat. No. 3,678,019 discloses a one-stage reaction system in which a monomer mixture of ethylene, higher alpha-olefin and diene is fed into a reaction vessel along with a Ziegler-Natta catalyst, a cocatalyst and aromatic hydrocarbon solvent. Similar processes are disclosed in U.S. Pat. Nos. 3,696,086 and 3,725,364. In such processes, diene conversion is only on the order of about 70 percent.

In conventional multi-stage reactions, the ethylene, higher alpha-olefin and non-conjugated diene are added to each reactor to maintain a relatively uniform composition of the terpolymer. One such multi-stage method is disclosed in U.S. Pat. No. 3,629,212. This patent shows that certain Ziegler catalysts can be reactivated by using a series of at least three reactors in which the ethylene, propylene and non-conjugated diene are added to each reactor. The EPDM polymerization reaction is conducted in all three reactors by adding the catalyst to the first reactor and adding a reactivator to the subsequent stages. This method of production has a number of disadvantages, however, including purification problems and the added cost of reactivator.

Another method using multi-stage reaction operations is disclosed in U.S. Pat. No. 4,016,342. In this process, ethylene, higher alpha-olefin, diene, Ziegler catalyst, cocatalyst, and solvent are added in the first stage of the reaction and all of these components with the exception of the Ziegler catalyst are also added to a second stage reactor. This process is said to provide EPDM elastomers having relatively broad molecular weight distributions and very narrow compositional distributions. However, the addition of diene in the second reaction stage, where catalyst concentration is low, results in a relatively high amount of unreacted diene, thus increasing the cost of the manufacture of the polymer and creating problems in sulfur curing the polymer.

SUMMARY OF THE INVENTION

It has now been found that improved diene conversion can be obtained without concomitant negative impact upon the physical properties of the EPDM-type polymers by a multi-stage process in which substantially all of the diene monomer is added to the first stage. Thus, in accordance with the present invention, a terpolymer is prepared by (1) adding to a first reactor solvent, from about 50 to 90 percent by weight of the totaL ethylene charge, from about 30 to 100 percent by weight of the total higher alpha-olefin charge, from about 30 to 100 percent by weight of the total Ziegler-Natta catalyst charge, from about 30 to 100 percent by weight of the total organoaluminum cocatalyst charge and non-conjugated diene, (2) partially polymerizing a portion of the ethylene, higher alpha-olefin and diene in that first reactor to form a polymer cement (polymer dissolved in the solvent); (3) passing the reactor contents including the polymer cement from the first reactor to a second reactor connected in series with the first reactor; (4) adding ethylene to the second reactor along with an amount of non-conjugated diene such that the resultant polymerized weight percent diene content of the polymer from the first reactor is at least about 10 percent greater, on a relative basis, than the resultant polymerized weight percent diene content of the polymer from the second reactor; and (5) further polymerizing the ethylene, higher alpha-olefin and non-conjugated diene in the second reactor. From about 50 to about 100 percent by weight of the total non-conjugated diene charge is added to the first reactor, preferably from about 80 to about 100 percent and most preferably, all of the non-conjugated diene charge is fed only into the first reactor. (For example, where the resultant non-conjugated diene content in the polymer from the first reactor would be 6% and that from the second reactor 5%, the relative difference in diene content of the two polymers is at least 10%; in this example it is 20% greater.) Typically, after the desired polymerization has been completed the contents of the second or subsequent reactor is discharged, the polymerization reaction of the discharged contents is terminated, and the terpolymer is collected and finished.

The process of the present invention can be performed by any of the well-known multi-stage reactor systems. One very suitable system is disclosed in U.S. Pat. No. 4,016,342. Of course, if desired, more than two reactors in series can be used in the process of the invention. The process of the present invention is equally applicable to slurry polymerization as to the solution process described herein.

In another suitable arrangement, the reaction zones may be within a single reactor with horizontal baffles dividing the reactor into two or more distinct zones for polymerization. In such an arrangement, separate feed inlets are provided for each reaction zone. The same sequence of adding solvent, monomers, catalyst and cocatalyst is provided in each zone, as in the case of two separate reactors.

Thus, in a two-stage reactor system such as the one shown in U.S. Pat. No. 4,016,342, the process of the present invention can be performed by continuously feeding ethylene, higher alpha-olefin, non-conjugated diene, solvent, catalyst and cocatalyst into the first stirred reactor. Without quenching or otherwise deactivating the catalyst components, except through attrition within the first reactor, the polymer cement is fed directly from the first reactor to the second reactor. Additional ethylene is fed continuously into the second reactor. Preferably, higher alpha-olefin is also fed continuously into the second reactor. Some non-conjugated diene can also be added to the second or subsequent reactor in an amount such that the resulting polymerized weight percent diene content of the terpolymer from the first or preceeding reactor is at least about 10 percent greater, on a relative basis, than the resulting polymerized weight percent diene content of the polymer from the second or following reactor. The monomers are thus further polymerized in the second reactor. Hydrogen, or other chain transfer agents, may also be optionally fed to one or more reactors to control polymer molecular weight.

The higher alpha-olefins useful in the practice of the present invention are those having from 3 to 8 carbon atoms and preferably from 3 to 6 carbon atoms. Illustrative of suitable higher alpha-olefins are straight and branched chain acyclic and alicyclic alpha-olefins including, propylene, butene-1, pentene-1, hexene-1, octene-1, 3-methyl butene-1, 4-methyl pentene-1, 5,5-dimethyl hexene-1, vinyl cyclopentane, allyl cyclopentane, and vinyl cyclohexane. A preferred higher alpha-olefin is propylene.

The non-conjugated dienes suitable for use in the process of the present invention are well-known. Suitable dienes include straight-chain and branched-chain acyclic dienes, such as 1,4-hexadiene, 1,5-hexadiene, 1,6-octadiene, 5-methyl-1, 4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane. Multi-ring alicyclic fused and bridged ring dienes are also suitable including: tetrahydroindene; methyltetrahydroindene; dicyclopentadiene; bicyclo (2,2,1) hepta-2,5-diene; 2-methyl bicycloheptadiene; and alkenyl, alkylidene, cycloalkenyl and cycloalkylidene norbornenes, such as 5-methylene-2-norbornene, 5-isopropylidene norbornene, 5-(4-cyclopentenyl)-2-norbornene; and 5-cyclohexylidene-2-norbornene. Preferred dienes are 5-ethylidene-2-norbornene, 1,4-hexadiene and dicyclopentadiene; particularly preferred is 5-ethylidene-2-norbornene.

The Ziegler-Natta catalyst systems used in the practice of the present invention are also well-known. Such catalyst systems include compounds of the transition metals of groups IVb, Vb and VIb of the Periodic Table. Vanadium and titanium compounds are preferred. Suitable vanadium compounds include compounds having the general formula $VO_zX_t$ wherein z has a value of 0 to 1, t has a value of 2, 3 or 4, and the sum of z and t is 4 or less and X is independently selected from the group consisting of halogens having an atomic number equal to or greater than 17, acetylacetonates (AcAc), haloacetylacetonates, alkoxides and haloalkoxides.

Nonlimiting examples are: $VOCl_3$, $VCl_4$, $VO(OC_2H_5)_3$, $VO(AcAc)_2$, $VOCl_2(OC_2H_5)$, $VOCl_2(OC_4H_9)$, $V(AcAc)_3$ and $VOCl_2(AcAc)$, where (AcAc) is an acetyl acetonate. Suitable titanium compounds include $TiCl_3$, $TiCl_4$ and compounds of the formula $Ti(OR)_4$ wherein R is an acyclic or alicyclic monovalent hydrocarbon radical of one to twelve carbon atoms. Examples of such titanium alkoxides include tetrabutyl titanate, tetraisopropyl titanate, and tetra(2-ethyl hexyl)titanate. Preferred catalyst systems employ $VOCl_3$ or $VOCl_3$ in combination with either $Ti(OC_4H_9)_4$ or $VO(OC_2H_5)_3$.

The organoaluminum compounds are useful as the cocatalysts in practice of the present invention. Suitable cocatalysts include compounds of the formula $AlR'_mX'_n$ wherein R' is a monovalent hydrocarbon radical selected from the group consisting of $C_1-C_{12}$ alkyl, alkylaryl, and cycloalkyl radicals, m is a number from 1 to 3, X' is a halogen having an atomic number equal to or greater than 17 (Cl, Br and I), and the sum of m and n is equal to three, e.g., $Al(C_2H_5)_3$, $Al(C_2H_5)_2Cl$, $Al(i-C_4H_9)_2Cl$, $Al(i-C_4H_9)_3$ and $Al(C_2H_5)Cl_2$. Mixtures of such compounds can also be used. Preferred cocatalysts are $Al(C_2H_5)_2Cl$ and $Al_2(C_2H_5)_3Cl_3$.

The solvents used in the process of the present invention comprise saturated alicyclic and acyclic hydrocarbons having 5 to 10 carbon atoms, aromatic hydrocarbons, and halogenated hydrocarbons that are liquids at the typical conditions used in EPDM reactors. Such solvents include hexane, cyclohexane, 2-methyl pentane, i-pentane, decane, benzene, toluene, carbon tetrachloride and tetrachloroethylene. A preferred solvent is hexane.

The reaction conditions in the process of the invention can vary greatly. Commercially available EPDM terpolymers have compositions ranging from 40 to 80 weight percent ethylene and 1 to 15 weight percent diene. Widely different monomer feed rates to the reaction system thus are needed to obtain this compositional diversity. Of course, the monomer feed rates also depend upon the desired rate of polymerization. In the case of the non-conjugated diene, feed rates can vary from about 0.05 to 4 weight per 100 weight of solvent to obtain diene contents in the terpolymer of between 1 and 15 weight percent at polymer concentrations in the reaction system from 5 to 20 weight polymer per 100 weight solvent. For EPDM polymerization carried out in solution, the polymer concentration is usually in the range of 5 to 10 weight polymer per 100 weight solvent, and diene feed rates would typically vary between 0.05 and 2 weight per 100 weight solvent.

When series reactors have been used to produce EPDM terpolymers the feed of non-conjugated diene is normally proportioned to each reactor according to the total weight of terpolymer made in that reactor. In this way, the polymerized diene content of the terpolymer made by previous methods was maintained at a uniform level along the reactor train. For example, if a two stage reaction system was operated such that 75 percent of the terpolymer was made in the first reactor and 25 percent in the second, the diene split between reactors would be roughly in the proportion of 75/25. By contrast, according to the process of this invention, substantially all of the diene and the Ziegler-Natta catalyst is added to the first reaction stage to improve the conversion of the diene. The EPDM terpolymer produced in this manner will have a non-homogeneous diene distribution. In other words, because the diene concentration decreases from reactor to reactor along the train as diene is consumed in the polymerization reaction, the amount of diene incorporated into the terpolymer will similarly decrease. Thus, the part of the terpolymer produced in the initial reactors will have a higher diene content than the polymer formed in the final reactors. It had been thought that this non-uniform diene distribution would be detrimental to the properties of the EPDM terpolymers so produced. However, it has been surprisingly found that the EPDM terpolymers having non-uniform diene distribution produced by the process of the present invention have properties similar to EPDM terpolymers produced either in a single stage system or in a multi-stage system with multiple diene feeds.

As a consequence of the similar properties obtained in polymers with uniform and non-uniform diene distributions, the preferred method of this invention is to add all of the diene to the first reaction stage to obtain the maximum diene conversion and the greatest economic benefit. However, it is within the scope of this invention to obtain an increase in diene conversion in a staged reactor, thereby producing a polymer with a non-uniform diene distribution in which the polymerized weight percent non-conjugated diene content of the terpolymer made in a reactor is at least about 10 percent greater on a relative basis than the polymerized weight percent diene content of the terpolymer made in the next succeeding reactor.

The feed rates of ethylene, higher alpha-olefin, catalyst and cocatalyst into the first and subsequent reaction stages are determined by the type and quantity of the polymer desired. Typically, the charge into the first reactor can contain from about 50 to about 90 percent by weight of the total ethylene charge, from about 30 to 100 percent by weight of the total higher alpha-olefin charge, from about 30 to 100 percent by weight of the total Ziegler-Natta catalyst charge, and from about 30 to 100 percent by weight of the total organoaluminum cocatalyst charge. In the first stage, the feed rates of these components can vary as indicated below:

|  | 1st Stage Feed Rate | Preferred 1st Stage Feed Rate |
| --- | --- | --- |
| Ethylene, wt/100 wt solvent | 1–10 | 2–5 |
| Higher Alpha-Olefin, wt/100 wt solvent | 1–20 | 2–10 |
| Catalyst, wt/100 wt solvent | .001–.05 | .002–.01 |
| Cocatalyst moles/mole catalyst | 2–100 | 3–15 |

In the second or subsequent stages of the process of the invention, ethylene, either alone or along with higher alpha-olefin, Ziegler-Natta catalyst, organoaluminum cocatalyst or mixtures thereof, can be added. Preferably, substantially all of the Ziegler-Natta catalyst and cocatalyst are added to the first reactor. The feed rates for the second or subsequent stage can vary as indicated below:

|  | 2nd Stage Feed Rate | Preferred 2nd Stage Feed Rate |
| --- | --- | --- |
| Ethylene, wt/100 wt solvent | 1–10 | 2–5 |
| Higher Alpha-Olefin, wt/100 wt solvent | 0–20 | 0–10 |
| Catalyst, wt/100 wt solvent | 0–.05 | 0 |
| Cocatalyst, moles/mole catalyst | 2–100 | — |

The temperature and pressure conditions in the process of the invention can also vary greatly. Suitable temperatures for conducting polymerization reactions are −50° to 150° C., preferably 0° C. to 100° C., and most preferably 10° C. to 70° C. The pressure at which the polymerization reaction is performed will depend upon the temperature in the polymerization reactor. In general, the pressure should be maintained at a sufficient level to maintain the solvent as a liquid. For the most preferred temperature range, the pressure required to maintain the reactants in a liquid phase is on the order of 20 to 200 psig. In series reactor operation, the temperature in each reactor can be the same or different. For the best process performance and product quality, it is often advantageous to allow the temperature to increase along the reactor train.

It may be desirable to control the molecular weight and molecular weight distribution of the polymer produced by the process of the present invention. In such a case, hydrogen, as is well-known in the art, may be added in any stage of the reaction in the proportion of from about 1.0 to about 10,000 ppm of ethylene and preferably from about 1.0 to about 500 ppm of ethylene.

The following examples are provided to illustrate, but not to limit, the process of the present invention:

EXAMPLE 1

This example illustrates the typical diene conversions and product quality obtained by producing EPDM rubber (A.) in a single stirred reactor, (B.) in a series reactor operation with multiple diene feeds and (C.) in a series reactor operation with diene feed into only the first reactor. Reaction conditions were selected to give a high Mooney viscosity polymer suitable for hoses and other mechanical applications.

(A.) Single Reactor Control

The polymerization was carried out in a 3 gallon stirred reactor continuously fed with the monomers, i.e., ethylene, propylene and 5-ethylidene-2-norbornene (ENB). All of the feeds were rigorously purified prior to entry into the reactor to remove polar impurities that act as catalyst poisons. Hexane was added to the reactor as a polymerization solvent and hydrogen was added to control the polymer molecular weight. The feeds were pre-chilled to remove some of the heat of reaction. Additional cooling was provided by circulating coolant through the reactor jacket.

A catalyst solution was prepared by dissolving 8.87 g. of vanadyl trichloride, $VOCl_3$, and 5.18 g of ethyl vanadate, $VO(OEt)_3$, together in 7.0 l of n-hexane. The cocatalyst consisted of 39.8 g of diethylaluminum chloride, $AlEt_2Cl$, in 6.75 l of n-hexane. These two solutions were pumped into the reactor at a rate of 0.786 l/hr.

Reactor temperature was controlled at 27° C. and the pressure was set at 60 psig to maintain all of the reactor contents in the liquid phase. Reactor feeds entered the bottom of the reactor and product exited from the top through a pressure control valve.

(B.) Series Reactor Operation With Multiple Diene Feed

This example illustrates the monomer conversions and product quality obtained when EPDM is made in two reactors connected in series with the diene feed split between the reactors such that the polymer made in each reactor has substantially the same diene content.

Two stirred reactors, each of 1 gallon capacity, were connected such that the polymer solution produced in the first reactor overflowed directly into the second reactor. Feed streams were prepared by the methods used in Example 1(A.). Hexane, monomers, hydrogen, catalyst, and cocatalyst were added to the first reactor. Hexane and monomers were also added to the second reactor at feed rates selected to produce a polymer in the second stage that was compositionally similar to the first reactor product. No fresh catalyst or cocatalyst was fed to the second reactor.

The temperature was controlled at 15° C. in the initial reaction stage and 34° C. in the final stage. Pressures in the two reactors were 65 and 60 psig, respectively.

used in Example 1(B.), except for the diene and hydrogen feeds. All of the ENB, 0.030 kg/hr, was added to the first reactor in this example.

Table I lists the feed rates for the monomers, catalysts, cocatalysts and hydrogen into each reactor in processes of Examples 1(A.), 1(B.) and 1(C.).

As the effluent left the reactor in Example 1(A.) and the second reactor in Examples 1(B.) and 1(C.), a small amount of i-propanol was added to the reactor effluent to deactivate the catalyst. In each of Examples 1(A.), 1(B.) and 1(C.), the polymer was then recovered from solution by boiling off the hexane in a steam heated water bath. The wet polymer which precipitated in the water was recovered, dried on a hot rubber mill, and analyzed for ethylene content by infrared measurement (I. J. Gardner, et al., *Rubber Chem. Tech.* 44, 1015 (1971)) and ENB content by refractive index measurement (I. J. Gardner and G. Ver Strate, *Rubber Chem. Tech.* 46, 1019 (1973)). Polymerization rates were determined from the weight of dry polymer recovered in a given time period. The ENB conversions, the rate of copolymerization, and catalyst efficiency for each reactor stage in the processes of Example 1(A.), 1(B.) and 1(C.) calculated from this data are listed in Table II. (Values for Reactor 2 were calculated from measured values for Reactor 1 and Reactor 1+2.)

TABLE I

| Reactor Feed Rates | Example 1A | Example 1B | | | Example 1C | | |
|---|---|---|---|---|---|---|---|
| | | Reactor 1 | Reactor 2 | Reactor 1 + 2 | Reactor 1 | Reactor 2 | Reactor 1 + 2 |
| Hexane (kg/hr) | 30 | 10 | 2.9 | 12.9 | 10 | 2.9 | 12.9 |
| Ethylene (kg/hr) | .96 | .27 | .12 | .39 | .27 | .12 | .39 |
| Propylene (kg/hr) | 1.17 | .54 | .074 | .61 | .54 | .074 | .61 |
| Diene (kg/hr) | .087 | .026 | .010 | .036 | .030 | 0 | .030 |
| $VOCl_3$ (g/hr) | .99 | .23 | 0 | .23 | .23 | 0 | .23 |
| $VO(OEt)_3$ (g/hr) | .58 | .14 | 0 | .14 | .14 | 0 | .14 |
| $AlEt_2Cl$ (g/hr) | 4.65 | 1.45 | 0 | 1.45 | 1.45 | 0 | 1.45 |
| $H_2$ (g/hr) | .0029 | .0027 | 0 | .0027 | .0038 | 0 | .0038 |

TABLE II

| | Example 1A | Example 1B | | | Example 1C | | |
|---|---|---|---|---|---|---|---|
| | | Reactor 1 | Reactor 2 | Reactor 1 + 2 | Reactor 1 | Reactor 2 | Reactor 1 + 2 |
| ENB Conversion (Wt. %) | 83 | 81 | | 82 | 82 | | 94 |
| ENB in polymer (WT. %) | 5.2 | 5.2 | 5.2 | 5.2 | 6.6 | 1.9 | 5.1 |
| Rate of Copolym. (g/hr) | 1386 | 371 | 159 | 530 | 371 | 175 | 546 |
| Cat. Eff. WT. Polym./WT. Van | 3186 | 3650 | 1562 | 5211 | 3652 | 1736 | 5388 |

(C.) Series Reactor Operation With Diene Feed To the First Reactor Only

This example illustrates the monomer conversions and product quality obtained when EPDM is made in two reactors in series with all of the diene fed to the first reactor according to the procedure of this invention.

The polymerization conditions and reactor feed rates for the process of this example were identical to those The results shown in Table II demonstrate that the process of the present invention provides the high catalyst efficiency of a series reactor operation, increased diene conversion (94%) over a single reactor control (83%) or a series reactor operation with multiple diene feed (82%), and a polymer having a non-uniform diene content.

The products recovered from the process of Examples 1(A.), 1(B.), and 1(C.), having the Mooney viscosities shown in Table III, were compounded according to the following formulation:

|  | Parts by Weight |
|---|---|
| Polymer | 100 |
| ASTM N-550 Carbon Black (e.g., FEF) | 100 |
| Paraffinic Oil (e.g., Flexon® 875) | 90 |
| Zinc Oxide | 10 |
| Stearic Acid | 1 |
| MBT[1] | 2.5 |
| TMTDS[2] | .8 |
| ZDBDC[3] | .8 |
| Sulfur | 1.5 |

[1] 2-mercaptobenzothiazole
[2] tetramethylthiuram disulfide
[3] zinc dibutyldithiocarbamate The formulations were cured for 5 minutes at 356° F. and the following properties of the vulcanizates were determined: 300 percent modulus, tensile strength, percent elongation and compression set. The results are set out in Table III.

TABLE III

| Property | Polymer of Example | | |
|---|---|---|---|
|  | 1A | 1B | 1C |
| Mooney (1 + 8) 260° F. | 66 | 70 | 65 |
| 300% Modulus, MPA | 7.4 | 7.6 | 8.2 |
| Tensile, MPA | 12.0 | 12.2 | 12.9 |
| Elongation, % | 490 | 510 | 500 |
| Compression Set | 27 | 29 | 24 |

The results shown in Table III demonstrate that, even though the terpolymer produced by the process of the present invention has a non-uniform diene distribution, it possesses physical characteristics similar to the polymer having a uniform diene composition produced by using a series reactor operation with multiple diene feed.

EXAMPLE 2

This example illustrates the typical ENB conversion and product quality obtained by producing EPDM rubber of low Mooney viscosity using (A.) a single stirred reactor, (B.) a series reactor operation with multiple diene feed, and (C.) a series reactor operation with diene feed only to the first reactor. Such products are suitable in rubber sponge and electrical insulation.

The polymerization procedures of Examples 1(A.), 1(B.), and 1(C.) were repeated, except that the temperature of the reaction in the single reactor control was regulated at 32° C. and the temperature of the reactions in the 2-stage systems was regulated at 17° C. in the first reactor and at 36° C. in the second reactor. Also, the monomer, catalyst, cocatalyst, and hydrogen feed rates were varied to produce the type of product described above. The feed rates to each reactor in the single reactor control (Example 2(A.)), and in the series reactor operation with multiple diene feed (Example 2(B.)), and in the series reactor operation with diene feed to only the first reactor (Example 2(C.)) are set out in Table IV.

The terpolymers produced by the procedures of Examples 2(A.), 2(B.), and 2(C.) were recovered and analyzed by the procedures described in Example 1 above. The ENB conversion, the ENB polymeric compositions, the rate of copolymerization, and the catalyst efficiency for each reactor stage in the process of Example 2(A.), 2(B.), and 2(C.) are listed in Tabel V. (Values for Reactor 2 were calculated from measured values for Reactor 1 and Reactor 1+2).

TABLE IV

| Reactor Feed Rates | Example 2A | Example 2B | | | Example 2C | | |
|---|---|---|---|---|---|---|---|
|  |  | Reactor 1 | Reactor 2 | Reactor 1 + 2 | Reactor 1 | Reactor 2 | Reactor 1 + 2 |
| Hexane (kg/hr) | 30 | 9.8 | 2.0 | 11.8 | 9.8 | 2.0 | 11.8 |
| Ethylene (kg/hr) | .813 | .26 | .14 | .40 | .26 | .15 | .41 |
| Propylene (kg/hr) | 2.41 | .70 | .15 | .85 | .76 | .20 | .96 |
| Diene (kg/hr) | .081 | .024 | .012 | .036 | .035 | 0 | .035 |
| $VOCl_3$ (g/hr) | 1.08 | .43 | 0 | .43 | .43 | 0 | .43 |
| $VO(OEt)_3$ (g/hr) | .63 | .25 | 0 | .25 | .25 | 0 | .25 |
| $AlEt_2Cl$ (g/hr) | 5.08 | 2.45 | 0 | 2.45 | 2.45 | 0 | 2.45 |
| $H_2$ (g/hr) | .020 | .0091 | 0 | .0091 | .010 | 0 | .010 |

TABLE V

|  | Example 2A | Example 2B | | | Example 2C | | |
|---|---|---|---|---|---|---|---|
|  |  | Reactor 1 | Reactor 2 | Reactor 1 + 2 | Reactor 1 | Reactor 2 | Reactor 1 + 2 |
| ENB (Conversion) (WT. %) | 74 | 86 |  | 80 | 75 |  | 83 |
| ENB in polymer (WT. %) | 4.5 | 4.4 | 4.4 | 4.5 | 5.8 | 1.1 | 4.3 |
| Rate of Copolym. g/hr | 1303 | 442 | 172 | 614 | 428 | 207 | 635 |
| Cat. Eff. WT. Polym./ |  |  |  |  |  |  |  |

TABLE V-continued

|  | Example 2A | Example 2B | | | Example 2C | | |
| --- | --- | --- | --- | --- | --- | --- | --- |
|  |  | Reactor 1 | Reactor 2 | Reactor 1 + 2 | Reactor 1 | Reactor 2 | Reactor 1 + 2 |
| WT. Van. | 2728 | 2319 | 902 | 3221 | 2246 | 975 | 3220 |

The data listed in Table V again demonstrate that the process of this invention results in high catalyst efficiency, increased diene conversion and a polymer with a non-uniform diene content.

The terpolymers produced by the processes of Examples 2(A.), 2(B.), and 2(C.), having the Mooney viscosities shown in Table VI, were compounded according to the following formulation:

|  | Parts by Weight |
| --- | --- |
| Polymer | 100 |
| FEF Carbon Black | 110 |
| Naphthenic Oil (e.g., FLEXON ® 680) | 40 |
| Zinc Oxide | 5 |
| Stearic Acid | 1 |
| TMTDS[1] | 3 |
| MBT[2] | .5 |
| Sulfur | 1.5 |

[1] tetramethylthiuram disulfide
[2] 2-mercaptobenzothiazole

The formulations were cured for 20 minutes at 320° F. The hardness, tensile strength, ultimate elongation, modulus at 100 percent and compression set for each of the vulcanizates were then measured. The results are set out in Table VI below.

TABLE VI

|  | Polymer of Example | | |
| --- | --- | --- | --- |
| Property | 2A | 2B | 2C |
| Hardness, Shore A | 76 | 75 | 74 |
| Tensile Strength, MPa | 13.4 | 13.6 | 13 |
| Ultimate Elongation, % | 210 | 210 | 210 |
| Modulus at 100%, MPa | 6.4 | 7.3 | 6.9 |
| Compression Set, %[a] | 20 | 17 | 20 |
| Mooney Viscosity (1 + 8) 212° F. | 43.5 | 38.5 | 40.5 |

[a] 22 hrs. at 70° C.

The results shown in Table VI again demonstrate that a terpolymer produced by the process of the present invention provides physical properties equivalent to EPDM terpolymers having a uniform diene composition.

EXAMPLE 3

The two-stage reactor system and operating procedure described in Example 1B was used to prepare two polymers with $VOCl_3$ as the catalyst and $AlEt_2Cl$ as the cocatalyst. For the polymer made at the conditions given for Example 3A in Table VII, the ENB feed rate to each reactor was adjusted so that the polymer ENB content was the same in both reactors as shown by the results in Table VIII. The polymer in Example 3B was made at the identical conditions, as shown by the data in Table VII, except relatively more of the ENB was added to the first reactor so that the ENB content of the polymers made in each stage would differ by more than 10%.

The results in Table VIII demonstrate that by producing the polymer with the non-homogeneous ENB content, the ENB conversion is raised from 85 to 90%. (ENB wt. % and rate of polym. values for reactor 2 were calculated from measured values for Reactor 1 and Reactor 1+2.)

TABLE VII

|  | Example 3A | | | Example 3B | | |
| --- | --- | --- | --- | --- | --- | --- |
| Reactor Feed Rates | Reactor 1 | Reactor 2 | Reactor 1 + 2 | Reactor 1 | Reactor 2 | Reactor 1 & 2 |
| Hexane, kg/hr | 16.8 | 1.5 | 18.3 | 16.8 | 1.5 | 18.3 |
| Ethylene, kg/hr | .31 | .17 | .48 | .31 | .17 | .48 |
| Propylene, kg/hr | .56 | 0 | .56 | .56 | 0 | .56 |
| ENB, kg/hr | .030 | .011 | .041 | .036 | .0051 | .041 |
| $VOCl_3$, g/hr | .57 | 0 | .57 | .57 | 0 | .57 |
| $AlEt_2Cl$, g/hr | 1.98 | 0 | 1.98 | 1.98 | 0 | .031 |
| $H_2$, g/hr | .031 | 0 | .031 | .031 | 0 | .031 |
| Reactor temp., °C. | 17 | 37 | — | 17 | 37 | — |

TABLE VIII

|  | Example 3A | | | Example 3B | | |
| --- | --- | --- | --- | --- | --- | --- |
|  | Reactor 1 | Reactor 2 | Reactor 1 + 2 | Reactor 1 | Reactor 2 | Reactor 1 + 2 |
| ENB feed to reactor (WT. %) | 73 | 17 | 100 | 88 | 12 | 100 |
| ENB conversion, (WT. %) | 78 | — | 85 | 86 | — | 90 |
| ENB in polymer (WT. %) | 5.01 | 5.01 | 5.01 | 6.43 | 2.39 | 5.49 |
| Rate of polym. g/hr | 469 | 226 | 695 | 480 | 208 | 684 |
| Mooney viscosity (I + 8) 260° F. | 15 | — | 19.5 | 20 | — | 22.5 |

It will be understood that the embodiments described above are merely exemplary and that persons skilled in the art may make many variations and modifications without departing from the spirit and scope of the invention. All such modifications and variations are intended to be included within the scope of the invention as defined by the appended claims.

What is claimed is:

1. A process for the preparation of elastomeric terpolymers of ethylene, higher alpha-olefin and non-conjugated diene selected from the group consisting of multi-ring alicyclic fused and bridged ring dienes and alkenyl, alkylidene, cycloalkenyl and cycloalkylidene norbornenes using reactors in series which comprises (1) adding to a first reactor solvent, from about 50 to 90 percent by weight of the total ethylene charge, from about 30 to 100 percent by weight of the total higher alpha-olefin charge, from about 30 to 100 percent by weight of the total Ziegler-Natta catalyst charge, from about 30 to 100 percent by weight of the total organoaluminum cocatalyst charge and non-conjugated diene, (2) partially polymerizing said ethylene, higher alpha-olefin and diene in said first reactor to form a polymer cement, (3) passing the reactor contents including said polymer cement from said first reactor to a second reactor connected in series with said first reactor, (4) adding ethylene to said second reactor along with an amount of said non-conjugated diene such that the resultant polymerized weight percent diene content of the polymer from said first reactor is at least about 10 percent greater, on a relative basis, than the resultant polymerized weight percent diene content of the polymer from the second reactor, and (5) further polymerizing said ethylene, said higher alpha-olefin and said non-conjugated diene in said second reactor.

2. A process according to claim 1, wherein from about 80 to 100 percent by weight of the total non-conjugated diene charge is added to said first reactor.

3. A process according to claim 1, wherein all of the non-conjugated diene charge is added to said first reactor.

4. A process according to claim 1, wherein substantially all of the higher alpha-olefin, Ziegler-Natta catalyst and organoaluminum cocatalyst is added to the first reactor.

5. A process according to claim 1, which further comprises discharging the contents of said second reactor, terminating the polymerization reaction of the discharged contents, and collecting and finishing the terpolymer thus produced.

6. A process according to claim 1, wherein said higher alpha-olefin is selected from the group consisting of propylene, butene-1, pentene-1, hexene-1, octene-1, 3-methyl-butene-1, 4-methyl pentane-1, 5,5-dimethylhexene-1, vinyl cyclopentane, allyl cyclopentane, and vinyl cyclohexane.

7. A process according to claim 1, wherein said higher alpha-olefin is propylene.

8. A process according to claim 1 or 6, wherein said non-conjugated diene is selected from the group consisting of 5-ethylidene-2-norbornene, 5-isopropylidene norbornene, methyl-tetrahydroindene and dicyclopentadiene.

9. A process according to claim 1 or 7, wherein said non-conjugated diene is 5-ethylidene-2-norbornene.

10. A process according to claim 1 or 6, wherein said catalyst is selected from the group consisting of $VOCl_3$, $VCl_4$, $VO(OC_2H_5)_3$, $VOCl_2(OC_2H_5)$, $VOCl_2(OC_4H_9)$, $V(AcAc)_3$, $VO(AcAc)_2$ and $VOCl_2(AcAc)$.

11. A process according to claim 1 or 7, wherein said catalyst is $VOCl_3$ in combination with a member selected from the group consisting of $Ti(n-OC_4H_9)_4$ and $VO(OC_2H_5)_3$.

12. A process according to claim 1 or 6, wherein said cocatalyst is selected from the group consisting of $Al(C_2H_5)_3$, $Al(C_2H_5)_2Cl$, $Al_2(C_2H_5)_3Cl_3$, $Al(i-C_4H_9)_2Cl$, $Al(i-C_4H_9)_3$, $Al(n-C_6H_{13})_3$, $Al(C_2H_5)Cl_2$ or mixtures thereof.

13. A process according to claim 1 or 7, wherein said cocatalyst is $Al(C_2H_5)_3$, $Al(C_2H_5)_2Cl$ or $Al_2(C_2H_5)_3Cl_3$.

14. A process according to claim 1 or 7, wherein a higher alpha-olefin is also added to the second reactor.

15. A process according to claim 1 or 6, wherein additional catalyst and cocatalyst are also added to said second reactor.

16. A process according to claim 1, wherein the polymerization reactions occur at a temperature in the range of from about $-50°$ to about $150°$ C. and at a pressure of from about 20 to about 500 psig.

17. A process according to claim 1, wherein the polymerization reactions occur at a temperature in the range of from about $10°$ to about $70°$ C. and at a pressure of from about 20 to about 200 psig.

18. In a process for preparing a terpolymer of ethylene, higher alpha-olefin and non-conjugated diene selected from the group consisting of muti-ring alicyclic fused and bridged ring dienes and alkenyl, alkylidene, cycloalkenyl and cycloalkylidene norbornenes using at least two stirred reactors in series, the improvement comprising feeding substantially all of the non-conjugated diene to the first reactor to produce a polymer that has a non-uniform diene distribution.

19. A process according to claim 1 or 7, wherein said solvent is hexane.

* * * * *